(12) United States Patent
Miyashita et al.

(10) Patent No.: US 11,732,807 B2
(45) Date of Patent: Aug. 22, 2023

(54) ECCENTRIC BUTTERFLY VALVE

(71) Applicant: KITZ CORPORATION, Chiba (JP)

(72) Inventors: Yukihiro Miyashita, Chino (JP); Kazuhisa Kubota, Chino (JP); Yuri Kobayashi, Chino (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 17/773,937

(22) PCT Filed: Oct. 29, 2020

(86) PCT No.: PCT/JP2020/040587
§ 371 (c)(1),
(2) Date: May 3, 2022

(87) PCT Pub. No.: WO2021/095542
PCT Pub. Date: May 20, 2021

(65) Prior Publication Data
US 2022/0364649 A1    Nov. 17, 2022

(30) Foreign Application Priority Data

Nov. 15, 2019    (JP) .................................. 2019-206717

(51) Int. Cl.
*F16K 1/226*   (2006.01)
*F16K 1/46*    (2006.01)
*F16K 27/02*   (2006.01)

(52) U.S. Cl.
CPC .............. *F16K 1/2266* (2013.01); *F16K 1/46* (2013.01); *F16K 27/0218* (2013.01)

(58) Field of Classification Search
CPC ....... F16K 1/2266; F16K 1/46; F16K 27/0218
(Continued)

(56) References Cited

U.S. PATENT DOCUMENTS 4,005,848 A * 2/1977 Eggleston ............. F16K 1/2266
                                                   251/173
4,513,765 A * 4/1985 Rishovd ................ F16K 1/2263
                                                   251/173
(Continued)

FOREIGN PATENT DOCUMENTS

JP          63-48065        4/1988
JP          2007-78001      3/2007
(Continued)

OTHER PUBLICATIONS

International Search Report dated Jan. 26, 2021 in International (PCT) Application No. PCT/JP2020/040587.

*Primary Examiner* — John Bastianelli
(74) *Attorney, Agent, or Firm* — Wenderoth, Lind & Ponack, L.L.P.

(57) ABSTRACT

An eccentric butterfly valve that maintains high sealability when closed even when a high-pressure fluid is oriented in either direction of a forward flow or backflow. The valve includes a disk (23) axially supported at an eccentric position via a stem (22) inside a body (21). The disk is provided to a seat ring (24) fixed with a seat retainer (25) so as to be hermetically sealable. A flexible part is formed on an inner diameter side of the seat ring, and a spring member is mounted between the flexible part and the seat retainer. In the spring member, a load increases substantially in proportion to the magnitude of tilt of the flexible part when the disk is displaced to a seat retainer side. When the flexible part is elastically deformed, the spring member is elastically deformed in a state where contact with the seat retainer is avoided.

18 Claims, 9 Drawing Sheets

(58) Field of Classification Search
USPC .................. 251/305–308, 174, 180, 192
See application file for complete search history.

(56) References Cited

U.S. PATENT DOCUMENTS

| | | | | |
|---|---|---|---|---|
| 4,593,916 | A * | 6/1986 | Laulhe | F16K 1/226 |
| | | | | 277/637 |
| 5,535,986 | A * | 7/1996 | Hutchens | F16K 1/2266 |
| | | | | 251/306 |
| 6,213,141 | B1 * | 4/2001 | Eggleston | F16K 1/2263 |
| | | | | 29/890.132 |
| 7,080,820 | B2 * | 7/2006 | Eggleston | F16K 27/0218 |
| | | | | 251/307 |
| 7,478,816 | B2 * | 1/2009 | Olberding | F16K 1/2266 |
| | | | | 251/173 |
| 9,127,775 | B2 * | 9/2015 | Helfer | F16K 1/2266 |

FOREIGN PATENT DOCUMENTS

| | | |
|---|---|---|
| JP | 6144847 | 6/2017 |
| JP | 2017-180742 | 10/2017 |

* cited by examiner

ECCENTRIC BUTTERFLY VALVE

TECHNICAL FIELD

The present invention relates to eccentric butterfly valves suitable for high-pressure fluid and, in particular, to an eccentric butterfly valve supporting flows in both directions of a forward flow and a backflow.

BACKGROUND ART

Conventionally, eccentric butterfly valves have been generally known as valves suitable for high-pressure fluids. Among these, for example, in a double eccentric butterfly valve, the valve shaft is eccentric to a flow path side with respect to the valve disk, and the rotation center of the valve disk is eccentric from the center of the valve diameter, thereby enhancing sealability when the valve is closed, compared with a central butterfly valve. Even in the valve of this type, in addition to a forward pressure, which is a pressure in a forward flow direction, the valve may be required to have sealability enhanced also for a reverse pressure, which is a pressure in a backflow direction. To support pressures in both of these directions, which are called both flows, it is required to enhance also, in particular, a valve seat sealing durability in the reverse pressure direction.

As an eccentric butterfly valve supporting both flow directions, for example, the applicant has submitted a patent application of the eccentric butterfly valve of PTL 1. In this eccentric butterfly valve 1, as depicted in a partially-enlarged schematic view of FIG. 8, between a valve box 2 and a seat retainer member 3, an annular integral seat ring member 4 is interposed. This seat ring member 4 includes, on its inner diameter side, a flexible portion 5 which is flexed to a flow direction of a forward flow or a backflow.

In a valve-closed state of this butterfly valve 1, when a forward flow occurs, a valve disk 6 inside the valve box 2 attempts to move by that fluid pressure (forward pressure) to a direction away from the seat ring member 4 (secondary side: right direction in the drawing). However, with a self seal function by fluid pressure, the flexible portion 5 pressurizes the valve disk 6 while being tilted to a valve disk 6 direction (right direction), thereby maintaining seal surface pressure between these and keeping valve seat sealability.

On the other hand, when a backflow occurs, the valve disk 6 moves by that fluid pressure (reverse pressure) to a direction of the seat ring member 4 (primary side: left direction in the drawing) to pressurize this seat ring member 4. With the flexible portion 5 of the seat ring member 4 being pressed onto the faced surface of the seat retainer member 3 and compressed, valve seat sealability at the time of reverse pressure is exerted.

Also, in the double eccentric butterfly valve of PTL 2, the seat ring member is provided by a combination of a resin-made seat ring and a metal seat ring. A tip side (flow path side) of this seat ring member is flexed in accordance with the flow direction of a forward flow or backflow. The seat ring member is mounted into the valve box via the seat retainer member, and a metal-made disc spring is mounted between these seat ring part and the seat retainer member.

In a valve-closed state of this valve, when a forward flow occurs, while the valve disk moves by that forward pressure to a direction away from the seat ring member, the fluid enters from a gap between the metal seat ring and the valve disk to pressurize the seat ring member. With this, a tip side of the resin-made seat ring is deformed so as to follow the movement of the valve disk to pressurize the valve disk, and a contact surface pressure between these is retained to attempt to keep valve seat sealability.

On the other hand, at the time of occurrence of a backflow, the valve disk moves by that reverse pressure to a direction of the seat retainer member and a force in a direction of compressing the resin-made seat ring is applied, and the resin-made seat ring attempts to move to this direction. In this case, the metal seat ring and the resin-made seat ring are pushed back by a repulsive elastic force of the disc spring arranged on the back surface of the metal seat ring to attempt to retain a contact surface pressure between the resin-made seat ring and the valve disk required for closing the fluid, thereby attempting to prevent leakage at the time of reverse pressure.

Meanwhile, this eccentric butterfly valve supporting both flows can be thought to be used as, for example, part of a pipe in a central air-conditioning (central air-conditioning) facility laid in a building such as a high-rise building.

FIG. 9(a) depicts a schematic view of a general central air-conditioning facility 10. In this central air-conditioning facility 10, a chiller (heat source machine) 11, a cooling tower 12, and so forth are arranged underground or on a rooftop, and these are connected to a circulative pipe 13. A longitudinal pipe 14 in the pipe 13 is provided with a branch flow path not depicted, and an air-conditioning system (air conditioner) on each floor is connected to this branch flow path. When the central air-conditioning facility 10 is activated, cold or hot water for air conditioning cooled or heated by the heat source machine 11 circulates inside the pipe 13 and is sent to the air-conditioning system on each floor through a branch pipeline, thereby performing air conditioning such as cooling and heating in the entire building.

In this central air-conditioning facility 10, the eccentric butterfly valve 1 supporting the above-described both flows may be used. In this case, the butterfly valve 1 is arranged on a lower side (lower-level side) of each of the longitudinal pipes 14, 14 on upstream and downstream sides of the pipe 13. Each butterfly valve 1 has its each of both ends on primary and secondary sides to which a connection flange 15 is attached with a pipe bolt not depicted, and is interposed in the longitudinal pipe 14 via this connection flanges 15. Each butterfly valve 1 is provided with an automatic or manual open/close operation part 16, and is provided so as to be able to be opened/closed by this open/close operation part 16.

When the central air-conditioning facility of FIG. 9(a) is activated, with cold or hot water cooled or heated being sent from the heat source machine 11 by a pump 17, this cold or hot water circulates inside the pipe 13 so as to ascend through the longitudinal pipe 14 on the left side in the drawing and descend through the longitudinal pipe 14 on the right side in the drawing, and is supplied to each floor from the longitudinal pipes 14 to lateral pipes.

On the other hand, in FIG. 9(b), when maintenance or the like of this central air-conditioning facility 10 is performed, in a state in which this central air-conditioning facility 10 is stopped, each of the butterfly valves 1 on the upstream and downstream sides is operated by using the open/close operation part 16 to become in a valve-closed state, and the connection flanges 15 on a lower side (lower-level side) with respect to these butterfly valves 1 and part of pipe 13 are removed to cause an end portion side of each butterfly valve 1 to be in a state called dead-end (dead end). With this, the flow path is divided on the lower side of the butterfly valve 1, and cleaning or the like of the inside of each pipe on an upper side (higher-level side) or lower side with respect to the butterfly valve 1 can be performed.

CITATION LIST

Patent Literatures

PTL 1: Japanese Patent No. 6144847
PTL 2: Japanese Patent Application Laid-Open No. 2007-78001

SUMMARY OF INVENTION

Technical Problem

In the case of the eccentric butterfly valve in a seal structure as in the former PTL 1, when a reverse pressure is applied in FIG. 8, the valve disk 6 moves to a direction of the seat ring member 4 in accordance with the magnitude of that pressure, thereby increasing also a force applied to the flexible portion 5 of the seat ring member 4. Here, when the reverse pressure is increased, the flexible portion 5 is crushed by the mounted surface of the seat retainer member 3, and there is a possibility that the flexible portion 5 is plastically deformed beyond allowable stress of the seat ring member 4, wear of the seat ring member 4 due to activation of the valve disk 6 increases, and the seal surface pressure significantly decreases to prevent exertion of the valve seat seal function.

On the other hand, in the latter PTL 2, at the time of occurrence of a reverse pressure, the seat ring member is attempted to be pushed back to the secondary side by the disc spring. Since the structure is such that this pushing-back force acts substantially constantly, when a high reverse pressure occurs, there is a possibility that the disc spring cannot bear that pressure to become greatly deformed and unable to push back the seat ring member. In this case, an excessive pressurizing force may be continuously applied to the flexible portion of the seat ring member to plastically deformed its tip side to cause valve seat leakage.

In addition to this, in the double eccentric butterfly valve, the valve disk has different left and right pressure-receiving areas across the stem shaft. Thus, in each of the above-described butterfly valves, a rotary force occurs to the stem in proportion to the magnitude of the fluid pressure. At the time of reverse pressure, a rotary force of the stem in a valve-closed direction occurs. In addition to an increase in seal surface pressure due to the movement of the valve disk, unbalanced torque, in which a rotary force is applied to the stem due to the above-described fluid pressure, also increases, and load torque of operation increases. With this, particularly at the time of automatic operation, abrupt activation (jumping) occurs when the valve starts opening from a fully-closed state. With this rapid activation, wear of the seat ring intensifies, possibly leading to a decrease in durability.

Furthermore, when the above-described eccentric butterfly valve is provided to a pipe of a central air-conditioning facility of a building such as a high-rise building, in FIG. 9(b), when a dead-end state is set when maintenance is performed or the like, gravitation occurs in water inside the pipe 13, and its water pressure is applied to the valve disk of each of the butterfly valves 1 on both sides. In this case, a reverse pressure in an arrow direction is applied to the butterfly valve 1 on the upstream side (left side in the drawing). When the longitudinal pipe extends with an increase in height of buildings, the reverse fluid pressure increases.

By contrast, since the connection flange 15 on the lower side of the butterfly valve 1 is removed, the fastening force by the pipe bolt pressurizing the seat retainer member until that time is completely lost, and the fastening force by the retainer bolt for fastening the seat retainer member is the only force pressurizing and retaining the seat ring member between the valve box and the seat retainer member.

In this state, when a high reverse pressure is applied to the butterfly valve 1, the amount of movement of the valve disk also significantly increases. In FIG. 8, the valve disk 6 moves to the left direction by the reverse pressure to cause the seat ring member 4 to be strongly pushed to a seat retainer member 3 direction and plastically deformed harder. With the seat ring member 4 being pushed out to the seat retainer member 3 side, the seat ring member 4 goes away from the valve box 2, and the seal surface pressure on the back surface of a base end portion of the seat ring member 4 also decreases. When the seal surface pressure of this base end portion decreases, this leads also to an occurrence of fluid leakage from this portion, which is called back leakage.

In addition to this, initially, when the seat ring member 4 is fastened with a retainer bolt, after the connection flange 15 is once fastened in a state in which the fastening force runs short, the connection flange 15 on the lower side is removed to a dead-end state. Then, the retainer bolt is loosened to decrease the seat surface pressure. With this, the seal surface pressure at the base end portion of the seat ring decreases and back leakage tends to occur more.

The present invention was developed to solve the conventional problems, and its object is to provide an eccentric butterfly valve which maintains high sealability when the valve is closed even when a pressure of a high-pressure fluid is applied to either direction of a forward flow or backflow and, in particular, maintains seal performance of a seat ring even when a high pressure is applied by a backflow, ensures a seal surface pressure between the seat ring and a disk to allow prevention of leakage, and is excellent in operability.

Solution to Problem

To achieve the above-described object, an invention according to claim 1 is directed to an eccentric butterfly valve in which a disk axially supported so as to be rotatable at an eccentric position via a stem inside a cylindrical body is provided to a seat ring fixed with a seat retainer inside the body so as to be hermetically sealable, wherein a flexible part which is tilted in accordance with displacement of the disk is formed on an inner diameter side of the seat ring; a spring member is mounted between this flexible part and the seat retainer, the spring which mutually springs back thereonto; this spring member is a spring in which, with the disk being displaced to the seat retainer side in a flow-path direction, a load in a spring-back direction increases in accordance with a magnitude of tilt of the flexible part by this displacement of the disk; and, when the flexible part is elastically deformed, the spring member pressurized by this flexible part is elastically deformed in a state in which a contact with the seat retainer is avoided, and is also mounted in a state in which a contact position with the seat ring gradually makes a transition from the inner diameter side to the outer diameter side with an increase in the tilt of the flexible part.

An invention according to claim 2 is directed to the eccentric butterfly valve in which the spring member is formed of an annular plate spring, and this plate spring is mounted so that, in a state in which an outer diameter side is caused to make contact with the seat retainer on a side faced to the seat retainer and an inner diameter side with respect to a position of contact to the seat retainer side is caused to make contact with the flexible part on a side faced to the seat ring, a position of contact with the seat ring gradually makes a transition from the inner diameter side to the outer diameter side with an increase in the tilt of the flexible part.

An invention according to claim 3 is directed to the eccentric butterfly valve in which in the flexible part, an annular contact surface which makes contact with this plate spring is formed on a side faced to the plate spring, and this annular contact surface is formed of a taper surface tilted at a predetermined angle from an inner diameter side to an outer diameter direction.

An invention according to claim 4 is directed to the eccentric butterfly valve in which the seat retainer has an annular protruding part having a trapezoidal cross section annularly formed on a side in contact with the plate spring, an annular contact part is formed at an outer diameter position of this annular protruding part, the annular contact part which makes a linear contact with the plate spring and serves as a fulcrum when the plate spring is elastically deformed, and a gap part which avoids a contact of a tilted portion of the spring member is formed on an inner diameter side of this annular contact part.

An invention according to claim 5 is directed to the eccentric butterfly valve in which an end portion of the annular contact surface on an outer diameter side is arranged on an inner diameter side of a normal with respect to the plate spring at a position of contact between the annular contact part and the plate spring.

An invention according to claim 6 is directed to the eccentric butterfly valve in which a fixing part which is fixed between the body and the seat retainer is integrally formed on an outer diameter side of the flexible part, and a gasket part integrally coupled via a thin-walled part to an annular periphery on an outer circumferential surface side of this fixing part is tightly interposed between the body and the seat retainer.

An invention according to claim 7 is directed to the eccentric butterfly valve in which in a hermetically-sealed state between the seat ring and the disk, the seat ring is fastened and fixed between the body and the seat retainer with a retainer bolt for fastening.

Advantageous Effects of Invention

From the invention according to claim 1, the valve has an eccentric valve structure, and the flexible part which is tilted in accordance with displacement of the disk is provided on the inner diameter side of the seat ring. Thus, even when the pressure of a high-pressure fluid is applied to either direction of a forward flow or backflow, high sealability is exerted when the valve is closed. In this case, the spring member is mounted between the flexible part and the seat retainer, and the load in the spring-back direction of this spring member increases in accordance with the magnitude of tilt of the flexible part. Thus, in particular, even when a high pressure is applied by a backflow, the seal surface pressure between the seat ring and the disk is improved in accordance with the magnitude of that pressure, and leakage can be reliably prevented. When the flexible part is elastically deformed, the spring member is deformed in a state in which a contact with the seat retainer is avoided. Thus, even if the flexible part is excessively deformed by a high reverse pressure, a contact of the spring member on a flexible part side with the seat retainer is prevented to suppress an abrupt increase in seal surface pressure; the seal surface pressure is improved to prevent leakage while deformation of the flexible part is allowed; breakage of the seat ring due to wear, rupture, and plastic deformation, or the like is prevented to maintain its elastic characteristics; and valve seat sealability is maintained when a reverse pressure and a forward pressure are applied when the valve is closed. Furthermore, the load torque by fluid pressure at the time of reverse pressure can be decreased by the resilient force of the spring member. Thus, abrupt activation (jumping) of the disk at the time of operation such as at the time of automatic operation is prevented to enhance operability and, by preventing wear of the seat ring due to this, durability is also improved. Here, the spring member is mounted in the state in which the contact position with the seat ring gradually makes a transition from the inner diameter side to the outer diameter side with an increase in the tilt of the flexible part. Thus, as the reverse pressure to the disk increases and the flexible part becomes greatly tilted, the spring load of the plate spring also increases so as to be substantially proportional. With this, even when an excessive reverse pressure is applied to the disk, the seal surface pressure between the seat ring and the disk is gradually improved by the load from the spring member in the spring-back direction to inhibit leakage, and plastic deformation of the flexible part can also be prevented.

From the invention according to claim 2, in the spring member formed of a plate spring, the outer diameter side is caused to make contact on the side faced to the seat retainer and the inner diameter side with respect to the seat retainer side is caused to make contact on the side faced to the seat ring. Thus, when a force is applied from the flexible part of the seat ring by a reverse pressure, the inner diameter side of the spring member is elastically deformed by taking the contact side with seat retainer as a fulcrum. Here, the spring member is mounted in the state in which the position of contact with the seat ring gradually makes a transition from the inner diameter side to the outer diameter side with an increase in the tilt of the flexible part. Thus, as the reverse pressure to the disk increases and the flexible part becomes greatly tilted, the spring load of the plate spring also increases so as to be substantially proportional. With this, even when an excessive reverse pressure is applied to the disk, the seal surface pressure between the seat ring and the disk is gradually improved by the load from the spring member in the spring-back direction to inhibit leakage, and plastic deformation of the flexible part can also be prevented.

From the invention according to claim 3, the annular contact surface formed of a taper surface tilted at a predetermined angle from the inner diameter side to the outer diameter side is formed on the side faced to the plate spring in the flexible part. Thus, when the flexible part becomes tilted to the spring member side, from a state in which the inner diameter side of the flexible part makes contact with the spring member, as the amount of tilt of the flexible part increases, that contact position gradually makes a transition to the outer diameter side. From this, with an increase in reverse pressure to the disk, the load of the spring member in the spring-back direction gradually increases, allowing the seal surface pressure with the disk to be increased while the tilt of the seat ring is suppressed by this spring load. By changing the tilt angle of the annular contact surface, the spring-back force of the plate spring with respect to the tilt amount of the flexible part can be changed. Thus, by changing the elastic deformation amount of the flexible part is changed in accordance with the magnitude of the occurring reverse pressure, valve seat sealability can be ensured.

From the invention according to claim 4, when a force is applied from the flexible part, the annular contact part serves as a fulcrum and, with the inner side of the plate spring being elastically deformed by taking this annular contact part as a center, excessive deformation of the flexible part can be prevented. With the gap part being provided on the inner diameter side of the annular contact part formed at the annular protruding part having a trapezoidal cross section, the width of this gap part is ensured, and a contact with the seat retainer when the spring member is deformed can be avoided. With this, an abrupt increase in counterforce from the spring member can be suppressed, and the flexible part tilted by the disk is inhibited from being tightly interposed between itself and the seat retainer as a fixing side together with the plate spring, and plastic deformation of the flexible part is reliably prevented.

From the invention according to claim 5, when a force acts on the plate spring from the flexible part, by deforming the plate spring so that the inner diameter side falls by taking the annular contact part as a fulcrum, a predetermined elastic force can be caused to occur, and plastic deformation of the seat ring due to stop of the tilt of the plate spring or an abrupt increase in counterforce is inhibited.

From the invention according to claim 6, the gasket part is formed on the outer circumferential side of the fixing part via a thin-walled part independently from the flexible part and the fixing part, and this gasket part is tightly interposed between the body and the seat retainer. Thus, back leakage from between the body and the seat retainer can be prevented. In this case, even if thermal expansion occurs in the gasket part when the fluid is at high temperatures, sealability between the body and the seat retainer is maintained when the temperature returns to ordinary temperature. With the thin-walled part being provided, deformation due to thermal expansion of the gasket part does not adversely affect the fixing part and the flexible part side. Also in the case of a high-temperature fluid, stable valve seat sealability by deformation of the flexible part can be maintained.

From the invention according to claim 7, only by the fastening force by fastening and fixing with the retainer bolt for fastening, a hermetical seal state between the seat ring and the disk can be ensured when the valve is closed, and it is not required to connect another member such as a flange tube to press the seat retainer to a body side. Thus, even in a dead-end state in which the attachment side of the seat retainer is formed as a dead end of the flow path, excellent sealability is exerted when a high reverse pressure occurs, and leakage can be prevented. Thus, also when the valve is used in part of a pipe in a high-rise building and an excessive head pressure in a reverse pressure direction is applied, while a balance is kept by elasticity of the spring member in accordance with displacement of the disk, in a state in which the seat retainer pressurizing force is suppressed low, it is possible to prevent the seat ring from being pushed out to the seat retainer side to prevent seal leakage and also to prevent a decrease in the seal surface pressure of the base end portion of the seat ring to reliably inhibit back leakage.

DESCRIPTION OF EMBODIMENT

Figure 1:
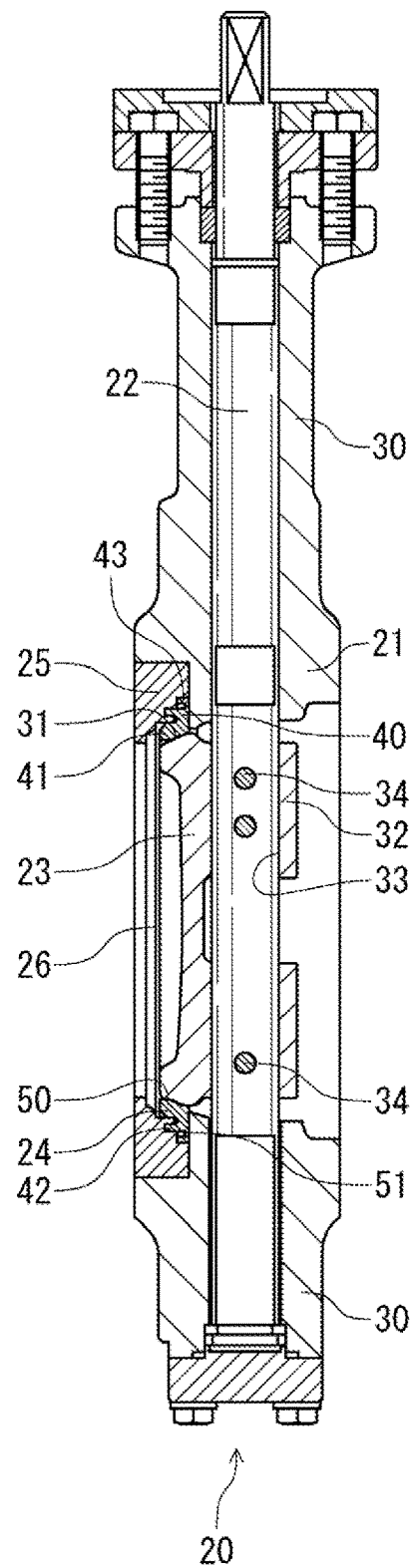
FIG. 1 is a longitudinal sectional view depicting one embodiment of an eccentric butterfly valve of the present invention.
Figure 2:
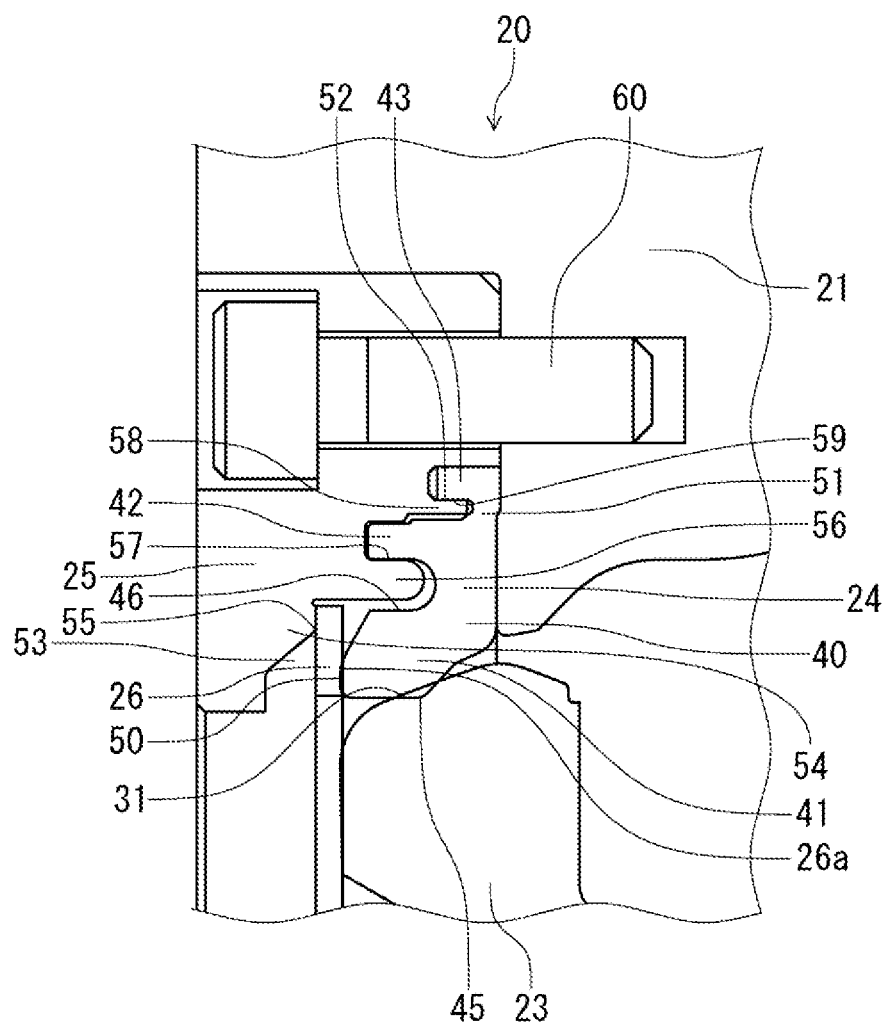
FIG. 2 is an enlarged schematic view of main parts of FIG. 1.

In the following, an embodiment of an eccentric butterfly valve in the present invention is described based on the drawings. In FIG. 1, one embodiment of an eccentric butterfly valve of the present invention is depicted. In FIG. 2, an enlarged schematic view of main parts near a seat ring mounted part of FIG. 1 is depicted. The eccentric butterfly valve (hereinafter referred to as a valve main body 20) in the present invention is provided by assuming a working pressure of forward pressure and reverse pressure of approximately 5 MPa.

Figure 3:
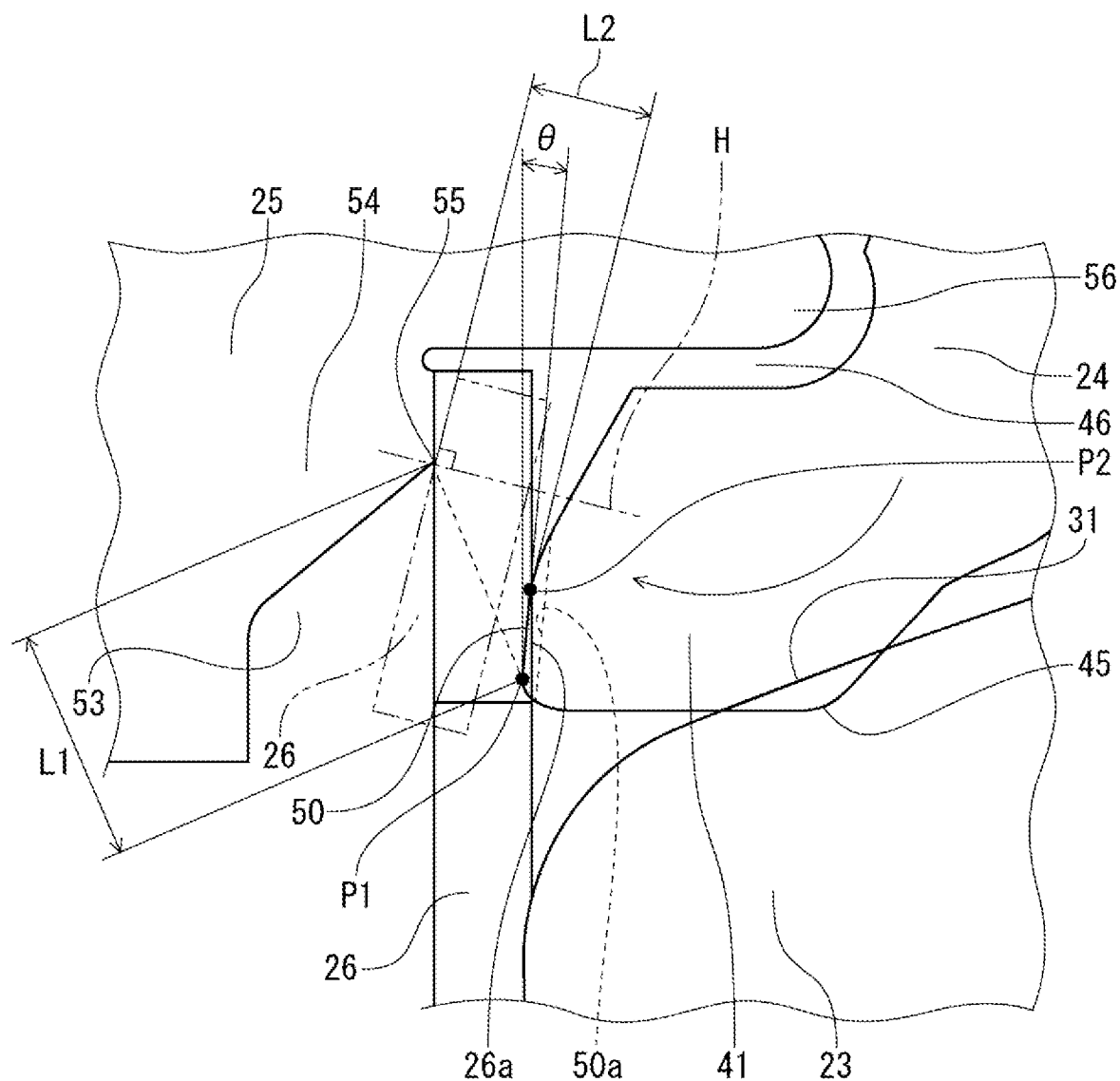
FIG. 3 is an enlarged schematic view of main parts depicting a portion near a flexible part.

In FIG. 1, the valve main body 20 is provided to have a size of, for example, diameter 300 A, and has a cylindrical body 21, a stem 22, a disk 23, a seat ring 24, a seat retainer 25, and a spring member 26. Among these, the body 21, the disk 23, and the seat retainer 25 are molded of a metal material such as stainless steel or cast steel. In the drawing, the left side of the valve main body 20 depicts an upstream side, the right side depicts a downstream side. In accordance with a fluid pressure (forward pressure) occurring when a fluid flows from the upstream side to the downstream side (forward flow) or a fluid pressure (reverse pressure) occurring when the fluid flows from the downstream side to the upstream side (backflow), the seat ring 24 is flexed rightward or leftward to prevent fluid leakage when the valve is closed. FIG. 2 and FIG. 3 each depict a portion near an upper portion of the disk 23 in the valve main body 20, and a lower side depicts an inner diameter side of the valve main body 20 and an upper side depicts an outer diameter side thereof.

As depicted in FIG. 1, the body 21 has its upper and lower portions each provided with a shaft-mounting part 30 for mounting the stem 22, and the disk 23 is axially supported at an eccentric position in the body 21 via the stem 22 mounted in these shaft-mounting parts 30. The disk 23 is provided so as to be able to hermetically seal the seat ring 24 fixed with the seat retainer 25 inside the body 21 when the valve is closed.

The disk 23 is formed in a substantially disk shape, and has its outer circumferential side provided with a valve disk seal surface 31 that can make contact with and seal the seat ring 24. On each of upper and lower portions of one surface side of the disk 23, a boss part 32 is formed to protrude. In this boss part 32, a hole part 33 for attachment of the stem 22 is formed so as to be eccentric from a seal position. In a state in which the stem 22 is inserted into the hole parts 33, the disk 23 is integrally fixed to the stem 22 with taper pins 34 at an eccentric position inside the body 21 and axially supported so as to be rotatable. Thus, the valve main body 20 of the present embodiment is formed of a double eccentric valve in which the stem 22 is eccentric with respect to the disk 23 and the rotation center of the disk 23 is eccentric from the center of the valve diameter.

In FIG. 2 and FIG. 3, the seat ring 24 is annually molded out of a resin material such as PTFE (polytetrafluoroethylene), and filler-filled PTFE is used in the present embodiment. The seat ring 24 has a ring-shaped base substrate part 40, a flexible part 41, a fixing part 42, and a gasket part 43. Note that FIG. 2 depicts a state of the valve main body 20 after assembling, and no fluid pressure is applied.

The base substrate part 40 is provided in a substantially rectangular cross section, exerting the function of a base part of the seat ring 24. On one side surface in the base substrate part 40, the flexible part 41 is integrally formed on its inner diameter side and the fixing part 42 is integrally formed on its outer diameter side. On the inner circumferential surface of the base substrate part 40, a mildly tilted surface contiguous from a seal contact part 45, which will be described further below, of the flexible part 41 is formed. The tilted surface may have a linear shape or curved shape or may be provided with a dent, and is provided to have an appropriate shape so as to exert flexibility when the disk 23 makes contact with the flexible part 41.

The flexible part 41 is formed on the inner diameter side of the base substrate part 40 with a predetermined material thickness, and the seal contact part 45 is provided on a side in contact with the disk 23. The seal contact part 45 is annularly provided to have a C-surface-shaped cross section or R-surface-shaped cross section and a predetermined seal width in a state of being positioned on a seat retainer 25 side of a bottom part of a space part 46 provided between the fixing part 42 and the flexible part 41 in a flow-path direction, and this seal width allows sealing by a surface contact with the disk 23.

On a side in the flexible part 41 faced to a spring member 26, an annular contact surface 50 in contact with this spring member 26 is formed. The annular contact surface 50 is provided as a taper surface mildly tilted at a predetermined tilt angle θ from the vertical direction toward an outer diameter direction. Any magnitude of the tilt angle θ can be set. When the tilt angle θ is small, the flexible part 41 can change the characteristics of the spring-back force of the plate spring 26 with a slight tilt. When it is large, the characteristics of the spring-back force cannot be changed unless the flexible part 41 is greatly tilted.

In the annular contact surface 50, a plurality of through slits 50a in a radial direction are provided. With these slits 50a being provided, while making contact with the plate spring 26, the annular contact surface 50 guides a forward-pressure fluid to the space part 46 to cause the seat ring 24 and the disk 23 to make a close contact with each other to achieve valve-seat sealing. While the slits 50a are provided at two locations with 180° pitches with respect to the annular contact surface 50 in the present embodiment, any number of slits 50a can be provided as required, depending on the difference in the size of the diameter of the valve main body 20.

The space part 46 in a recessed groove shape is provided on an outer diameter side of the flexible part 41. When displacement to a flow-path direction occurs with the disk 23 being moved or flexed by forward pressure or reverse pressure to a horizontal direction or tilted direction with respect to the flow-path direction, the flexible part 41 is flexed through the space part 46 in accordance with the magnitude of this displacement to be tilted to the flow-path direction, thereby causing the seal contact part 45 to make contact with and seal the valve disk seal surface 31.

On the outer diameter of the flexible part 41, the fixing part 42 is formed across the space part 46. With this fixing part 42 fixed between the body 21 and the seat retainer 25, the seat ring 24 is mounted into the valve main body 20 in a dropping-prevented state. The fixing part 42 can have any shape that does not prevent flection to a left-right direction (flow-path direction) of the flexible part 41, and is provided to have a rectangular cross section in the present embodiment.

A thin-walled part 51 is formed on the annular periphery on an outer circumferential surface side of the fixing part 42 and, contiguously to this thin-walled part 51, a hook-shaped gasket part 43 is formed integrally with the fixing part 42. The gasket part 43 is mounted in a close-contact state into an insertion recessed groove 52 formed on the seat retainer 25 and, in this state, is tightly interposed between this seat retainer 25 and the body 21, thereby allowing prevention of back leakage of the fluid from therebetween. The thin-walled part 51 is provided to have a thickness on the order of, for example, 1 mm to 1.5 mm. With this, even if thermal expansion occurs, an outflow of an excessive portion due to this thermal expansion can be suppressed.

The spring member 26 is formed of an annular flat-shaped plate spring on the outer diameter where it is able to be mounted between the seat ring 24 and the seat retainer 25, and is provided so as to be able to be mounted in a state of mutually springing back onto them. The plate spring 26 is arranged in a state in which its outer diameter side is caused to make contact with a side faced to the seat retainer 25 and an inner side with respect to the contact position on a seat retainer 25 side is caused to make contact with the flexible part 41 on a side faced to the seat ring 24. When the flexible part 41 is flexed to be tilted, the annular contact surface 50 makes contact with the plate spring 26, thereby causing the plate spring 26 to attempt to be elastically deformed from the inner diameter side. With an increase in the tilt amount of the flexible part 41, the position of contact with the seat ring 24 gradually makes a transition from the inner diameter side to the outer diameter side.

Note that the material of the plate spring 26 is stainless steel, and the thickness of the thin-walled part 51 is 1.35 mm for nominal diameter B designations 2½ to 4; 1.45 mm for nominal diameter B designations 5 to 8; and 1.7 mm for nominal diameter B designations 10 to 12.

With the plate spring 26 being provided, the disk 23 is displaced to a seat retainer 25 side by fluid pressure (reverse pressure). When the flexible part 41 becomes tilted by this displacement, the spring load of the plate spring 26 in a spring-back direction increases so as to be substantially proportional to the magnitude of this tilt. In this case, the plate spring 26 is deformed so that its inner diameter side becomes tilted more as the flexible part 41 becomes tilted.

The seat retainer 25 is formed in a substantially annular shape. Near its outer diameter side, the above-described plate spring 26 is arranged. The seat ring 24 is provided to be able to be mounted in a tentatively-mounted state so as to interpose this plate spring 26. With this, the seat retainer 25, plate spring 26, and seat ring 24 are able to be mounted in an integrated state into the body 21. In the seat retainer 25, on an attachment surface side for the spring member 26 and the seat ring 24, provided are, in an order from its inner diameter side: an annular gap part 53, an annular protruding part 54, an annular contact part 55, an annular convex part 56, an annular concave-shaped groove 57, an annular protrusion part 58, and the annular recessed groove 52. These make the seat retainer 25 formed in an uneven shape.

The annular protruding part 54 is formed at a position where the plate spring 26 is to be able to be mounted, so as to have a trapezoidal cross section which can make contact with this plate spring 26. At an outer diameter position with respect to the annular protruding part 54, the annular contact part 55 is provided, and the plate spring 26 can make contact with this annular contact part 55 in a linear contact state. With this, the plate spring 26 is elastically deformed so that its inner diameter side becomes tilted to the flow-path direction by taking a contact portion with the annular contact part 55 as a fulcrum.

The gap part 53 is formed on an inner diameter side with respect to the annular contact part 55, and a tilted portion of the plate spring 26 on the inner diameter side deformed by the pressure of the elastically-deformed flexible part 41 can be accommodated inside this gap part 53. Any size of the gap part 53 can be set by adjusting the height and width of the annular protruding part 54, and is a space with a width in which, when a portion of the deformed plate spring 26 on the inner diameter side is accommodated, its tip side of the inner diameter does not make contact with the seat retainer 25.

Figure 6:
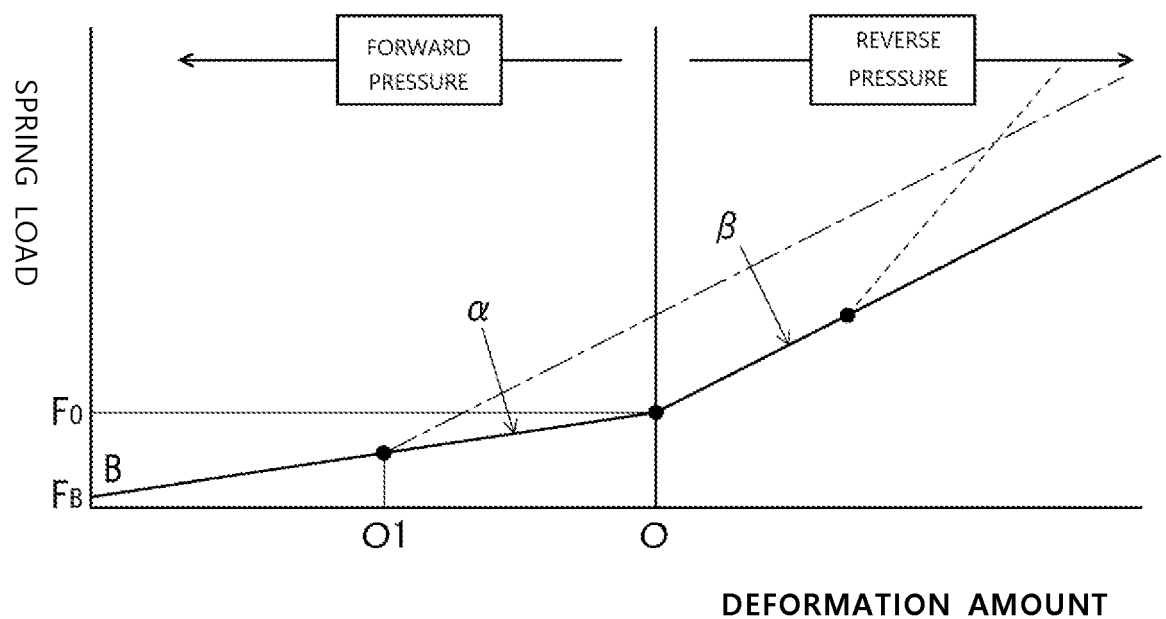
FIG. 6 is a graph representing a relation between the deformation amount and spring load of a plate spring.

Here, in a graph depicted in FIG. 6, a broken line indicates a virtual line when the plate spring 26 makes contact with the seat retainer 25 in the valve main body 20 with a point of inflection taken as an origin O. Here, with an abrupt increase in the rate of increase in spring load with respect to the deformation amount of the plate spring, there is a possibility that an excessive force is applied to the seat retainer 25 to plastically deform the seat ring 24. Therefore, by providing the gap part 53, a contact of the tilted portion of the plate spring 26 with the seat retainer 25 is avoided. Since the flexible part 41 is not tightly interposed between the disk 23 and the seat retainer 25, plastic deformation of the flexible part 41 can be prevented.

In FIG. 3, when a force is applied from the flexible part 41 to the plate spring 26 in the state of contact between the plate spring 26 and the annular contact part 55 described above, the force is applied to the plate spring 26 by taking the annular contact part 55 as a fulcrum. In this case, an end portion of the annular contact surface 50 on the outer diameter side (position of a point P2) is arranged on an inner diameter side of a normal H with respect to the plate spring 26 at the position of contact between the annular contact part 55 and the plate spring 26.

In FIG. 2, the annular convex part 56 is formed at a position faced to the space part 46 of the seat ring 24 on an outer diameter side with respect to the annular protruding part 54, and is provided to have a length shorter than the depth of this space part 46 and have a thickness closer to the annular concave-shaped groove 57 and narrower than the width of the space part 46. The annular concave-shaped groove 57 is formed at a position faced to the fixing part 42 of the seat ring 24 and with a depth and width which allow the fixing part 42 to be inserted and fixed on the outer diameter side of the annular convex part 56. The annular protrusion part 58 is formed at a position faced to the thin-walled part 51 and with a length and thickness which allow the annular protrusion part 58 to be inserted in an annular insertion space 59 provided between the fixing part 42 and the gasket part 43. The insertion recessed groove 52 is formed at a position faced to the gasket part 43 and with a depth and width which allow this gasket part 43 to be inserted for close sealing.

The seat ring 24 is mounted into the seat retainer 25 in a state of interposing the plate spring 26. Here, in a state in which the annular convex part 56, the annular concave-shaped groove 57, the annular protrusion part 58, and the annular recessed groove 52 of the seat retainer 25 are faced to the space part 46, the fixing part 42, the thin-walled part 51, and the gasket part 43 of the seat ring 24, respectively, the state becomes such that these are respectively incorporated. After the seat ring 24 and the seat ring 25 are incorporated, the fixing part 42 is fixed to the annular concave-shaped groove 57 in a fit-in state, and the fixing part 42 thereby becomes in a state of being positioned. Thus, the flexible part 41 is arranged at a predetermined position in a radial direction.

In a state of being arranged between the body 21 and the seat retainer 25 as described above, the seat ring 24 is integrally fixed, with these fastened with a retainer bolt 60 for fastening. In this case, the body 21 and the seat retainer 25 are fixed, with a contact surface side of these being in a state of a surface contact by what is called metal touch. The retainer bolt 60 has a fastening force of a predetermined magnitude. After its fastening, a hermetically sealed state between the seat ring 24 and the disk 23 is kept with the valve main body 20 not requiring an external fastening force when the valve is closed.

By this fastening force of the retainer bolt 60, the seal contact part 45 pressurizes the disk 23 when the valve is closed, the flexible part 41 becomes slightly tilted to a seat retainer 25 side, and the inner diameter side of the plate spring 26 becomes in a state of also being slightly pushed to a seat retainer 25 side. In this state, two forces occur, that is, the counterforce of the plate spring 26 occurring by the tilt of the flexible part 41 and a force by the warp of the seat ring 24 itself. These forces cause a seal surface pressure between the disk 23 and the seat ring 24.

Note that the base substrate part 40, the flexible part 41, and the fixing part 42 of the seat ring 24 are not strictly limited by their shapes and functions. That is, when the flexible part 41 is flexed and tilted, not only this flexible part 41 but also part of the base substrate part 40 is flexed. When a behavior occurs in the flexible part 41 by a thermal change, that behavior is mitigated by the fixing part 42. In this manner, for example, the fixing part 42 has also a function other than the function for fixing the seat ring 24. Also, for example, the gasket part 43 has not only the back leakage prevention function but also a function of fixing the seat ring 24.

Each part of the fixing part 42 and the gasket part 43 is preferably provided with a crushing margin of a predetermined volume as required. In this case, with the crushing margin being pressurized to improve the surface pressure, sealability with the seat retainer 25 is improved to improve the leakage prevention function.

Next, the operation and action of the eccentric butterfly valve of the present invention in the above-described embodiment are described by using the graph of FIG. 6, together with a mechanism when a pressure is applied to the seat ring 24. In FIG. 6, a relation is depicted between a deformation amount when a pressure is applied to the plate spring 26 and a spring load occurring in accordance with this deformation amount.

In the graph, the origin O where the load characteristic of the plate spring 26 changes when a forward pressure or reverse pressure is applied to the valve is defined as a point of inflection. At the origin O, the state is a no-load state in which no fluid pressure is applied to the valve, and the spring load of the plate spring 26 at this time is represented by the magnitude of a load $F_O$. By taking the origin O as a boundary, the load characteristic by the counterforce of the plate spring 26 applied to the seat ring 25 is varied between a forward pressure state and a reverse pressure state. With reference to the position of the origin O, a left side of this origin O is taken as a state in which a forward pressure is applied and a right side thereof is taken as a state in which a reverse pressure is applied.

In a state in which the valve main body 20 is open (not depicted), the seat ring 24 is hardly tilted, and a force of the plate spring 26 by which the seat ring 24 is pressurized is extremely small. From this state, when the valve main body 20 starts closing, the disk 23 pressurizes the seat ring 24 to tilt the plate spring 26, and a counterforce of this plate spring 26 thereby acts on a seat ring 24 side.

In an assembled state of FIG. 2, the spring member 26 is arranged so as to provide a slightly weak spring-back force to the flexible part 41. A spring-back force F in this case is set on the order of 20% to 30% of a maximum spring-back force of the spring member 26, as depicted in the spring load $F_O$ of FIG. 6.

Also when the valve main body 20 is caused to become in a full-open state in a state of being applied with a forward pressure, the spring-back force of the spring member 26 is applied to the flexible part 41. However, the spring-back force in this case is to the extent that the spring member 26 is in contact with the flexible part 41 and, as indicated by a spring load FB at a B point of FIG. 6, the load is set at 5% to 10% of the maximum spring-back force of the spring member 26.

Thus, in the present invention, the spring member 26 is always in contact with the flexible part 41. With this, in accordance with the tilt of the flexible part 41, in either case of a forward pressure or a reverse pressure, the spring member 26 immediately follows the motion of the flexible part 41, and responsiveness is therefore favorable.

FIG. 1 to FIG. 3 each depict a fully-closed state of the valve main body 20, depicting a no-load state in which no fluid pressure is applied to the valve main body 20, that is, a state in which the fluid pressure to the valve main body 20 at the origin O is 0 MPa. In this case, the valve disk seal surface 31 of the disk 23 pressurizes the seal contact part 45 of the flexible part 41 to a left direction, and the seat ring 24 is deformed, with its fixing part 42 being fixed and retained between the body 21 and the seat retainer 25, so that the flexible part 41 is tilted slightly leftward. Here, a force from the flexible part 41 by its elasticity is applied to the plate spring 26, and a spring load when this plate spring 26 is deformed is applied to the flexible part 41.

Thus, in the state at the origin O, a force to a disk 23 direction acts onto the flexible part 41 due to its own flexibility and the elasticity of the plate spring 26, thereby causing the seal contact part 45 to make a close contact with the valve disk seal surface 31 with a predetermined seal surface pressure to exert sealability.

On the side of the flexible part 41 faced to the plate spring 26, the annular contact surface 50 is provided which has a substantially cone shape tilted at the predetermined tilt angle θ to the outer diameter direction. Thus, the inner diameter side of the flexible part 41 is in a state of being closer to the plate spring 26. In the no-load state in the present embodiment, as depicted in FIG. 3, a contact is made with the plate spring 26 in a range from a point P1 on the inner diameter side to the point P2 on the outer diameter side of the flexible part 41. Thus, in the assembled state, that is, in the no-load state in which a fluid is not applied, the annular contact surface 50 of the flexible part 41 makes a surface contact with the plate spring 26 in the range from the point P1 to the point P2.

From this state, when a forward pressure or reverse pressure is applied to the valve main body 20, the spring load is varied in accordance with each of cases when (1) a forward pressure/reverse pressure is applied to the plate spring 26 and (2) the tilt angle θ of the annular contact surface 50 is varied with respect to the plate spring 26. Thus, these (1) and (2) are each discussed below.

As for the case (1) when a forward pressure/reverse pressure is applied to the plate spring 26, when a forward pressure/reverse pressure is applied to the valve main body 20, the seat ring 24 falls by the fluid pressure, and the position of contact with the plate spring 26 makes a transition in accordance with the degree of this falling of the seat ring 24. With this, the load characteristic of the counterforce of the plate spring 26 applied to the seat ring 24 is changed as indicated by a solid line of FIG. 6, and the load characteristic with spring constants of two types occurs in the plate spring 26 of one type.

Figure 4:
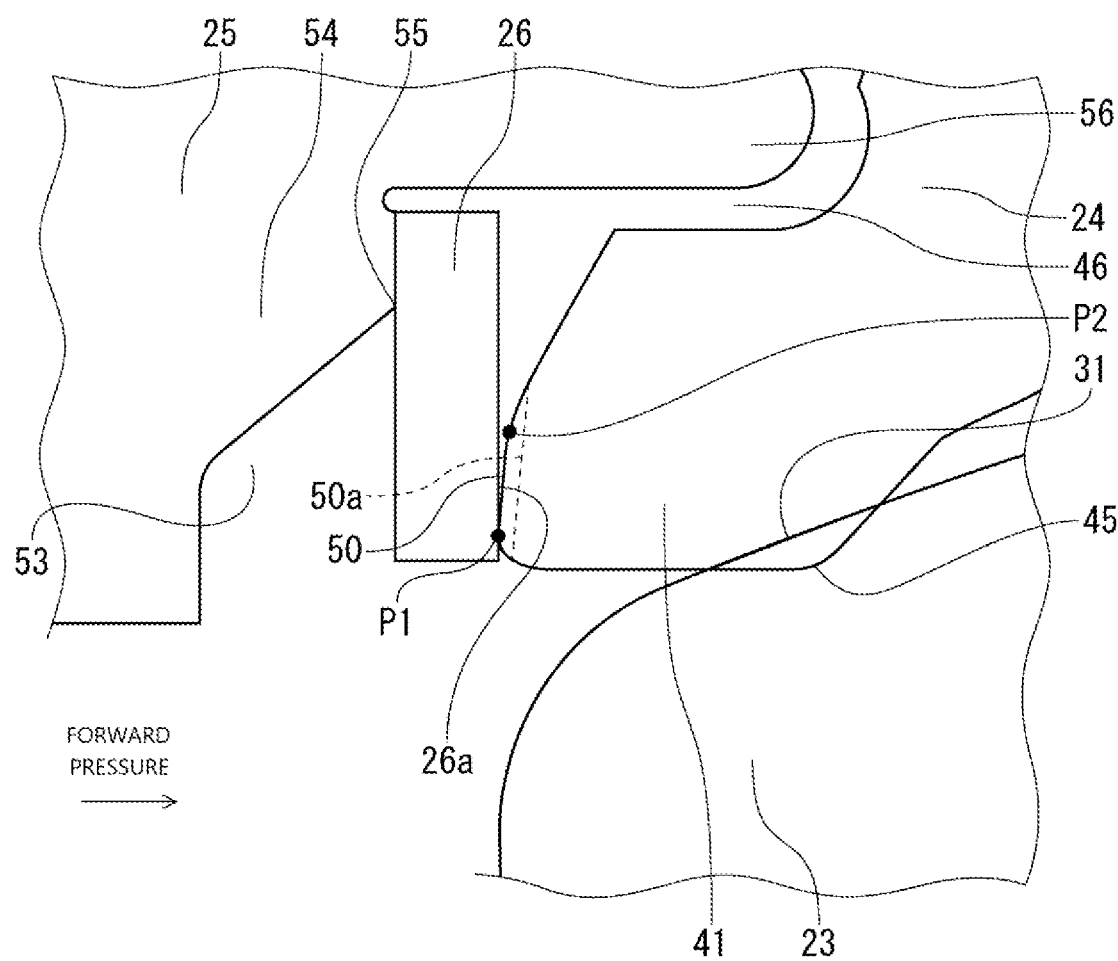
FIG. 4 is an enlarged schematic view of main parts, depicting a state in which a forward pressure is applied in FIG. 3.

In the forward pressure state, the falling of the seat ring 24 is small. In this case, as depicted in FIG. 4, a contact is made with a contact surface 26a of the plate spring 26 at the point P1 of the annular contact surface 50, and the load applied from the plate spring 26 to the seat ring 24 is relatively small.

In the forward pressure state, the falling of the seat ring 24 is small, and the annular contact surface 50 of the flexible part 41 makes a substantially linear contact with the plate spring 26 at the point P1 on an inner circumferential side. This state is a state near α in FIG. 6, and the spring load applied from the plate spring 26 to the seat ring 24 is smaller than the spring load $F_O$ at the origin O.

Figure 5:
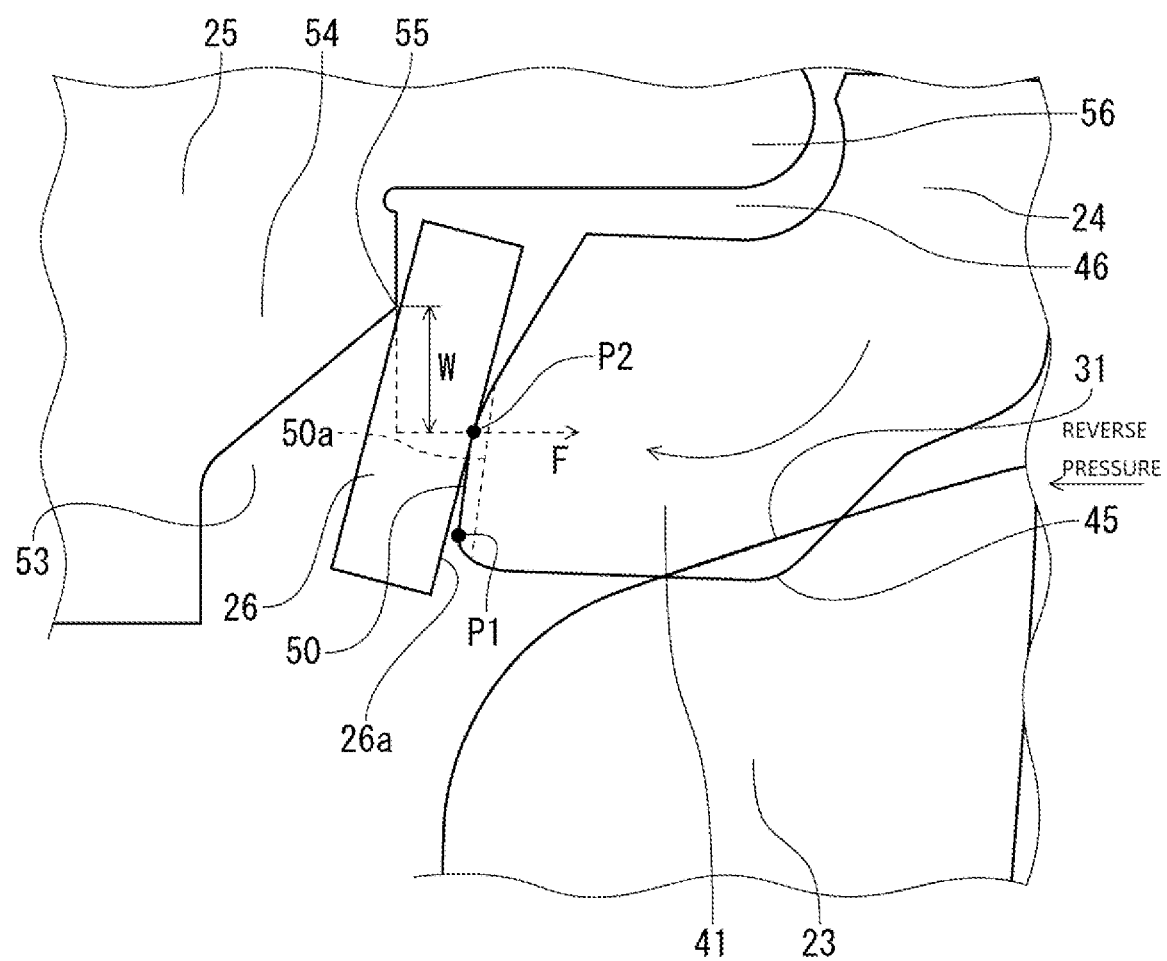
FIG. 5 is an enlarged schematic view of main parts, depicting a state in which a reverse pressure is applied in FIG. 3.

On the other hand, in the reverse pressure state, as depicted in FIG. 5, the falling of the seat ring 24 is large. In this case, a contact is made with the plate spring 26 at the point P2 of the annular contact surface 50, and the load applied from the plate spring 26 to the seat ring 24 is large.

In the reverse pressure state, the falling of the seat ring 24 is large, and the annular contact surface 50 of the flexible part 41 makes a substantially linear contact with the plate spring 26 at the point P2 on an outer circumferential side. This state is a state near β in FIG. 6, and the spring load applied from the plate spring 26 to the seat ring 24 is larger than the spring load $F_O$ at the origin O.

As these described above, when a pressure is applied to the specific plate spring 26, the present embodiment has a characteristic in which the spring load mildly changes in a forward pressure region and abruptly changes in a reverse pressure region compared with the forward pressure region.

The case in which a forward pressure or reverse pressure is applied to the valve main body 20 is described in detail. When a reverse pressure is applied, as depicted in FIG. 5, with the disk 23 being displaced, the flexible part 41 becomes more tilted, and the position of contact between the flexible part 41 and the plate spring 26 gradually makes a transition to a point P2 side of the outer diameter. When a counterforce is further applied, the load of the plate spring 26 increases as a contact is made by a linear contact at the point P2. Thus, when a fluid pressure is applied to the seat ring 24, the seat ring 24 becomes gradually tilted, and the position of contact with the plate spring 26 makes a transition in accordance with the magnitude of that tilt.

With a linear contact being made at the point P2, a distance W between the annular contact part 55 and the point P2 (in the present embodiment, this indicates a distance in a radial direction) becomes constant. Thus, the moment represented by the product of the distance W and the spring load F of the plate spring 26 can be stably obtained, and sealability with the disk 23 at the seal contact part 45 of the flexible part 41 can be reliably ensured.

Here, on the side faced to the seat retainer 25, a contact is made on the outer diameter side of the plate spring 26. On the side faced to the seat ring 24, a contact is made on the inner diameter side with respect to a seat retainer 25 side. Thus, in the plate spring 26, the inner diameter side is elastically deformed by taking the annular contact part 55 of the seat retainer 25 as a fulcrum.

On the other hand, when a forward pressure in an arrow direction is applied to the valve main body 20 in a valve-closed state, as depicted in FIG. 4, a seal surface pressure occurring from warpage of the seat ring 24 and the plate spring 26 at the time of assembling, the valve seat can be sealed at the time of low pressure.

In this case, the fluid pressure causes the disk 23 to attempt to move to a downstream side (right side), and the flexible part 41 attempts to become tilted to the downstream side while maintaining a state of close contact with the disk 23. In this manner, sealability between the seal contact part 45 and the valve disk seal surface 31 can be maintained. With the movements of these to the downstream side, the magnitude of the spring load F from the plate spring 26 is also decreased. On the forward pressure side of FIG. 6, as the forward pressure increases, the elastic deformation amount of the plate spring 26 decreases, and the spring load thereby further decreases. Near the maximum fluid pressure, the load of the plate spring 26 is extremely small.

Thus, when the tilt of the flexible part 41 is small, the state becomes such that the plate spring 26 is in contact with the point P1 on the inner diameter side of the annular contact surface 50, and the load applied from this plate spring 26 to the flexible part 41 is small.

When the flection of the disk 23 and the warp of the stem 22 increase with an increase in fluid pressure, the disk 23 moves to a stem 22 side as a secondary side to decrease the seal surface pressure. Furthermore, the warp of the plate spring 26 being in a slightly tilted state when assembled decreases with the movement of the disk 23, and the spring load applied from this plate spring 26 to the flexible part 41 also decreases. However, the flexible part 41 receiving the fluid pressure falls to a disk 23 side, and the seal contact part 45 presses onto the disk 23 to cause a self seal function to act with the seat ring 24 alone, thereby maintaining valve seat sealability.

When the tilt angle θ of the annular contact surface 50 is set, in consideration of the operation of the seat ring 24 at the time of reverse pressure and forward pressure described above, the tilt angle θ is set at 12° for a small-diameter valves (for example, nominal diameters 65 A to 80 A). On the other hand, the tilt angle θ is set at 4° for large-diameter valves (for example, nominal diameters 200 A to 300 A). This is because the amount of movement of the disk 23 is smaller for small-diameter valves and a large movement (rotational motion) of the flexible part 41 is required to be ensured. For this reason, the tilt angle θ is set larger compared with that for large-diameter valves.

Figure 7:
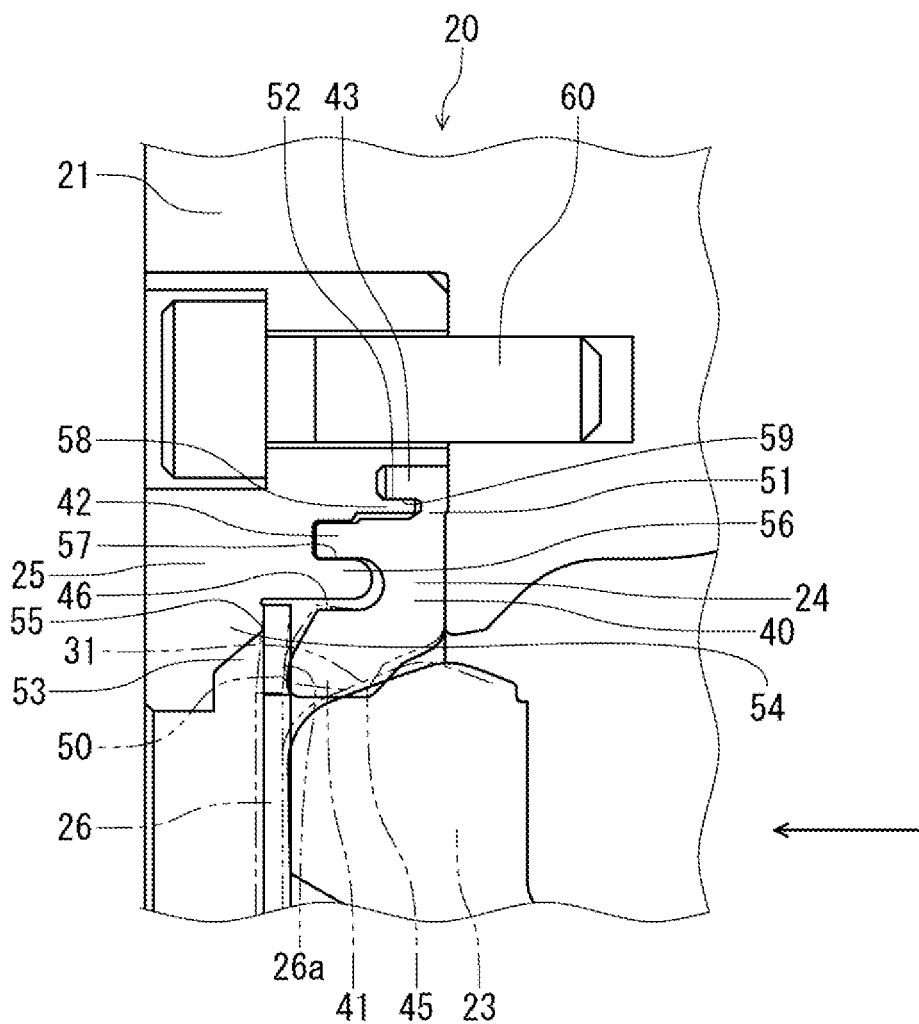
FIG. 7 is an enlarged schematic view of main parts, depicting a state in which a reverse pressure is applied to the eccentric butterfly valve of FIG. 1.
Figure 8:
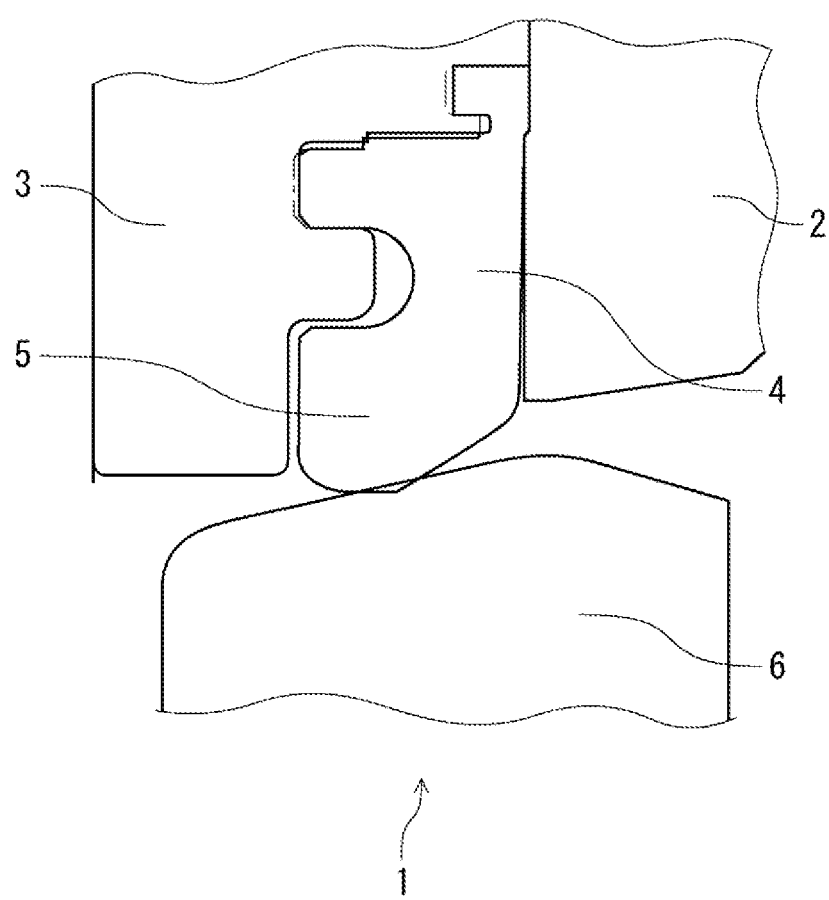
FIG. 8 is a partially-enlarged schematic view depicting a portion near a seat ring mounted part of a conventional double eccentric butterfly valve.

Here, at the time of reverse pressure described above, the disk 23, the seat ring 24, and the plate spring 26 attempt to be deformed to a state indicated by a two-dot-chain line in FIG. 7. Here, as depicted in FIG. 3, the flexible part 41 becomes tilted to an arrow direction.

When warps occur to the disk 23 and the stem 22 due to the fluid pressure and the disk 23 moves to a seat ring 24 direction (leftward), which is an upstream side, the seat ring 24 is pushed out by this movement to a seat retainer 25 side, and the inner diameter side of the plate spring 26 also attempts to become tilted. As the fluid pressure rises to high pressure, the amount of movement of the disk 23 increases, and the tilt of the flexible part 41 of the seat ring 24 and the plate spring 26 significantly increases. The tilt of the flexible part 41 is influenced also by the reverse pressure onto the seat ring 24. For this, with the plate spring 26 being tilted, a spring-back force is applied to a direction in which the flexible part 41 falling from this plate spring 26 is tried to be returned to an original state, thereby ensuring sealability.

Specifically, in FIG. 3, when the flexible part 41 becomes tilted to the arrow direction, its annular contact surface 50 makes contact with the plate spring 26 in a range from the point P1 to the point P2. Here, in the case of forward pressure, a contact is made almost at the point P1, and a force applied to the flexible part 41 has a low load characteristic. In the case of reverse pressure, a contact is made from the point P1 to the point P2, and a load with a high load characteristic occurs. The flexible part 41 becomes tilted in a state of being in contact with the plate spring 26 from the point P1 to the point P2 in accordance with the disk position with reverse pressure/forward pressure, and a spring load is applied to the flexible part 41 in accordance with that tilt amount.

In particular, when the reverse pressure is applied, the plate spring 26 makes contact at the position of the point P2, and the spring load from this plate spring 26 increases. However, since the seat ring 24 is retained in a balanced state with an appropriate seal surface pressure, excessive deformation of the flexible part 41 is prevented. With this, even if the reverse pressure is large, plastic deformation, wear, and breakage of the seat ring 24 are prevented to maintain the seal performance, the seal surface pressure between the seat ring 24 and the disk 23 is ensured to allow reliable prevention of seal leakage.

In the drawing, when a distance from the point P1, which is a contact point with the plate spring 26 at the time of minimum deformation of the flexible part 41, to the annular contact part 55 is taken as a distance L1 and a distance from the point P2, which is a contact point with the plate spring 26 at the time of maximum deformation of the flexible part 41, to the annular contact part 55 is taken as a distance L2, a relation of distance L1>distance L2 holds. Thus, as the tilt amount of the flexible part 41 increases with changes in fluid pressure to the disk 23, the distance from the annular contact part 55 to the position where a force is applied is shortened. From this, as depicted in FIG. 6, with the flexible part 41 being greatly tilted by the reverse pressure, the load of the plate spring 26 increases so as to be substantially proportional. Even if an excessive reverse pressure is applied to the disk 23, the seal surface pressure with the disk 23 can be improved while the tilt of the flexible part 41 is suppressed.

Next, the case (2) is described in which the tilt angle θ of the annular contact surface 50 is varied with respect to the plate spring 26.

By changing the magnitude of the tilt angle θ, the timing (position of the point of inflection) of switching the load characteristic of the plate spring 26 with respect to the flow direction of the fluid can be changed by the valve main body 20 of the same size.

For example, by setting the point of inflection at the position of the origin O1, as indicated by a one-dot-chain line of FIG. 6, the high load characteristic can be exerted earlier from the forward pressure side to support the fluid pressure.

From these, any point of inflection when the tilt angle θ of the plate spring 26 is formed is set, the load characteristic before the point of inflection is set as a low load characteristic for use in a region on the forward pressure side and the load characteristic after the point of inflection is set as a high load characteristic for use in a region on the reverse pressure side, thereby obtaining a valve of a desired characteristic. If the tilt angle θ of the annular contact surface 50 is set large, this is suitable for a small-diameter valve with a small amount of movement of the disk 23. On the other hand, if the tilt angle θ is set small, the spring-back force of the plate spring 26 can be caused to act when a large reverse pressure is applied to the flexible part 41, and this is suitable for a large-diameter valve with a large amount of movement of the disk 23.

Thus, it is possible to provide a valve in which the point of inflection (origin O) in the graph in FIG. 6 is set at any position depending on the magnitude of the tilt angle θ of the annular contact surface 50 and appropriate sealability can be exerted in accordance with the difference in diameter from a small diameter to a large diameter.

As described above, in the valve main body 20 of the present invention, the flexible part 41 is formed on the inner diameter side of the seat ring 24, and the plate spring 26 is mounted between this flexible part 41 and the seat retainer 25. In this plate spring 26, the spring load changes in accordance with magnitude of tilt of the flexible part 41 due to displacement of the disk 23. Thus, for example, even if a high-pressure fluid on the order of a forward pressure of 5 MPa to a reverse pressure of 5 MPa is applied to the disk 23, in a state in which sealability when the valve is closed is highly maintained, sealability at the time of both of forward pressure and reverse pressure can be achieved to reliably prevent leakage. Here, with the spring load increasing or decreasing in accordance with magnitude of fluid pressure, an excessive seal surface pressure of the valve at high reverse pressure can also be suppressed, thereby improving operability.

With the gap part 53 provided on the inner diameter side of the annular contact part 55, even when an excessive force is applied to the inner diameter side of the plate spring 26 due to the tilt of the flexible part 41 by reverse pressure, as indicated by a two-dot-chain line of FIG. 3, that tilted portion is deformed so as to escape to the gap part 53, thereby allowing a contact of the inner diameter side of the plate spring 26 with the seat retainer 25 to be avoided. With this, the possibility that the deformed flexible part 41 is tightly interposed between the seat retainer 25 and the plate spring 26, and the disk 23 is eliminated. With changes in the deformation amount of the plate spring 26 at the time of reverse pressure in FIG. 6 being maintained so as to be substantially proportional, the seal surface pressure does not abruptly increase, and plastic deformation of the flexible part 41 can be prevented.

As depicted in FIG. 3, with the end portion (position of the point P2) of the annular contact surface 50 on the outer diameter side being arranged on the inner diameter side of the normal H, the contact point between the flexible part 41 and the plate spring 26 is positioned on the inner diameter side of the normal H, at any location from the point P1 to the point P2. With this, when a force is applied from the disk 23 to the flexible part 41, a force in a clockwise direction always acts on the contact point between the flexible part 41 and the plate spring 26 by taking the annular contact part 55 as a center. Since the direction of this force matches the direction in which the inner diameter side of the plate spring 26 is deformed, it is possible to efficiently transmit the force from the flexible part 41 to the plate spring 26 to exert the spring load.

By contrast, if the end portion of the annular contact surface 50 on the outer diameter side is arranged on the outer diameter side of the normal H, when a force is applied from the disk 23 to the flexible part 41, a force in a counterclockwise direction acts on the contact point between the flexible part 41 and the plate spring 26 by taking the annular contact part 55 as a center. Since this force is oriented in reverse to the deformation direction of the inner diameter side of the plate spring 26, the motion of the plate spring 26 stops, and a force further pressurizing the plate spring 26 acts on the flexible part 41, and there is a possibility of plastic deformation of the flexible part 41. Thus, as described above, the end portion (position of the point P2) of the annular contact surface 50 on the outer diameter side is preferably arranged on the inner diameter side of the normal H.

Note that it is further preferable that the spring characteristic (spring constant) of the plate spring 26 be set so that that spring load is changed at the point of flection to become low in the forward pressure region and high in the reverse pressure region.

The reason for this is as follows. Since the self seal function using the fluid pressure can be exerted in the forward pressure region as described above, even if the seat ring 24 itself wears and a decrease in resilience occurs in the seat ring itself, seal can be made as long as the plate spring has a spring load allowing a minimum seal surface pressure to be obtained in a low pressure region of the forward pressure. Furthermore, also in an intermediate and high pressure region, with enhancement of the self seal function, sealability is exerted almost without requiring the spring load. From these, it is only required that the spring load of the plate spring 26 at the time of forward pressure be to the extent of slightly occurring in a low-pressure no-load state.

On the other hand, in the reverse pressure region, it is required to support the flexible part 41 tilted by the movement of the disk 23 and support the seat ring 24 tilted by the fluid pressure. Thus, forces acting on these are maintained by the load of the plate spring 26 to be in a balanced state. Thus, the spring load is set so as to increase as the fluid pressure increases.

In the present embodiment, the point of inflection (origin O) is set so that, in accordance with the tilt amount of the flexible part 41 of the seat ring 24, the contact point between this flexible part 41 and the plate spring 26 makes a transition so as to satisfy the above-described conditions in the forward pressure region and the reverse pressure region. With one plate spring 26, it is possible to support so as to achieve a low load characteristic with a low rate of increase of the spring constant in the forward pressure region side of the plate spring 26 and a high load characteristic with a high rate of increase in the spring constant on the reverse pressure region side (after the point of inflection) by taking this point of inflection as a boundary.

The fixing part 42 is integrally formed on the outer diameter side with respect to the flexible part 41, and the hook-shaped gasket part 43 is integrally formed on the outer circumferential surface side of this fixing part 42 via the thin-walled part 51. Thus, this gasket part 43 is fixed in a fixed-fitted state independently from the fixing part 42 and the flexible part 41 between the body 21 and the seat retainer 25. Thus, in the gasket part 43, an outflow of superfluous thermal expansion at the time of high temperatures in a heat cycle can be suppressed and, even when the temperature returns to ordinary temperature, its capacity can be maintained and back leakage can be inhibited.

When the valve main body 20 is assembled, the seat ring 24 and the disk 23 are set in a hermetically-sealed state, and the body 21 and the seat retainer 25 in a metal-touch state are firmly fastened and fixed with the retainer bolt 60. Since it is not required to further fasten the seat ring 24 after fixing, stress mitigation of the seat ring 24 occurring when the piping bolt is removed. Also, since the retainer bolt 60 is also not loosened, the fastened state is maintained. Here, by setting the compression ratio and the filling rate of the gasket part 43 to the insertion recessed groove 52 at minimum necessary, the fastening force by metal touch can also be further improved.

In addition to this, a surface contact is made between the entire surface of a portion of the body 21 near a tap for the retainer bolt 60 and the entire surface of the seat retainer 25, the fastening force of the retainer bolt 60 can be maintained.

By fastening and fixing with the retainer bolt 60, a function of supporting the seat ring 24 tilted by the fluid pressure, a function of supporting the seat ring 24 and the plate spring 26 tilted by the disk 23, and a function of maintaining the surface pressure of the gasket part 43 to maintain sealability are exerted.

As described above, since sealability of the seat ring 24 against the reverse pressure when the valve is closed can be maintained only by the fastening force of the retainer bolt 60, seat leakage and back leakage can be prevented even when a connection flange on an upstream side of the valve main body 20 is removed to set a dead-end state.

Figure 9:
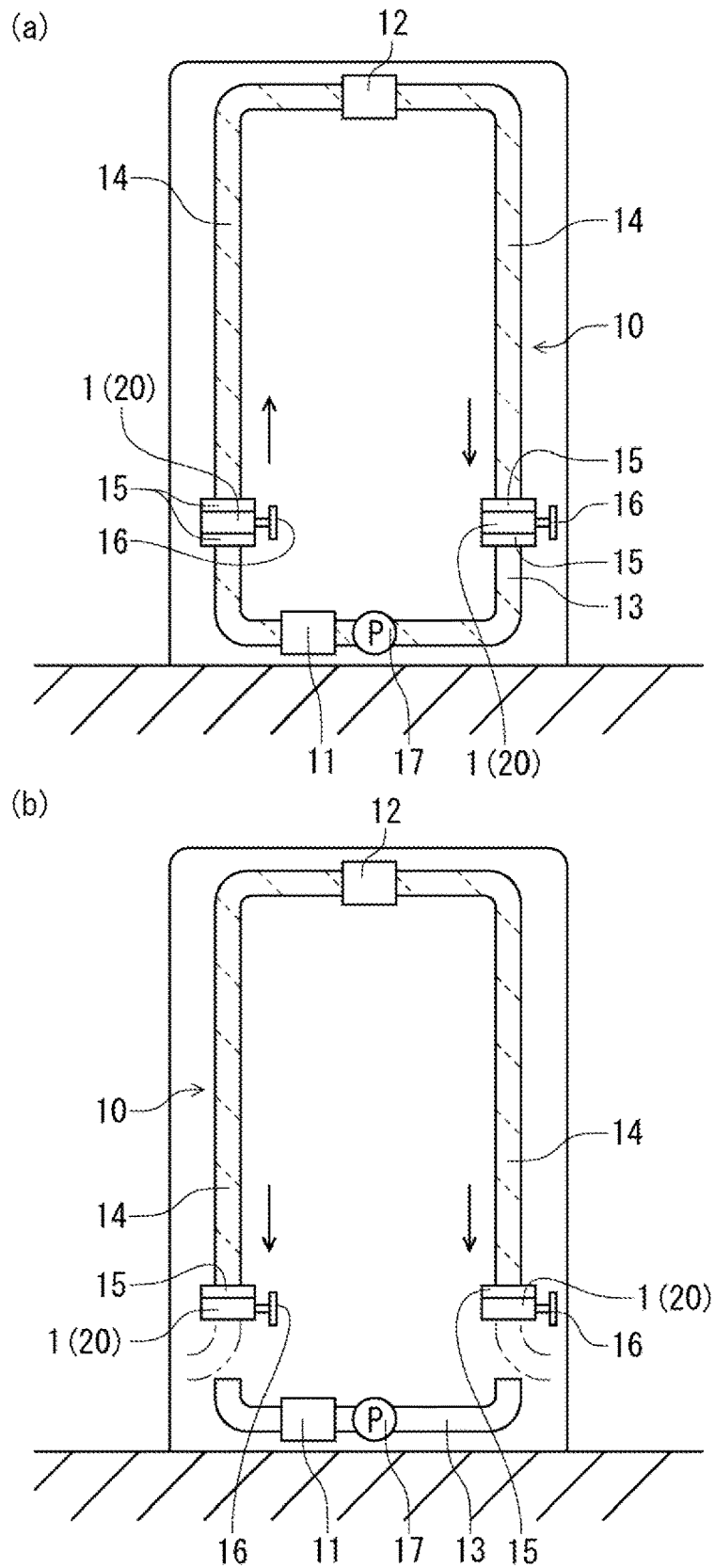
FIG. 9 is a schematic view depicting one example of a central air-conditioning facility.

From this, for example, the valve main body 20 of the present invention can be used, for the longitudinal pipes 14 of the central air-conditioning facility 10 depicted in FIG. 9. In this case, the cooling tower 12 is arranged on an upper side (high-level side), and the valve main body 20 is disposed on a lower side (lower-level side) of each of the longitudinal pipes 14 on the upstream and downstream sides of the pipe 13. The valve main body 20 is set in an open state to cause the central air-conditioning facility 10 to be in an activated state in FIG. 9(a), or the valve main body 20 is set in a closed state to cause the central air-conditioning facility 10 to be in a stop state in FIG. 9(b) and, in this case, maintenance or the like can be performed.

In the state of FIG. 9(b), at the time of maintenance, the connection flange 15 and part of the pipe 13 on the lower side of the valve main body 20 are removed to cause the lower side of the valve main body 20 to be in a dead-end state. This allows maintenance and cleaning inside each of the pipes 13 on the upper side or the lower side of this valve main body 20.

In this dead-end state, when a water pressure inside the pipe 13 is applied by gravitation to the valve main body 20, in particular, to the valve main body 20 on the left of the drawing (the valve arranged in a state in which the seat retainer 25 is positioned at a lower portion), the reverse pressure becomes excessive by head pressure as the longitudinal pipes 14 is elongated with an increase in height of buildings. Also for this excessive reverse pressure, by the counterforce of the plate spring only by the fastening force of the retainer bolt, the seal surface pressure between the seat ring and the disk is maintained to prevent leakage, and back leakage from a gasket part side can be inhibited. With this, by preventing plastic deformation and wear of the seat ring, sealability of the valve seat can be maintained for a long period of time.

In the forgoing, while the embodiment of the present invention has been described in detail, the present invention is not limited to Description of Embodiment described above and can be variously changed in a scope not deviating from the spirit of the invention described in the claims of the present invention.

REFERENCE SIGNS LIST 20 valve main body
20 body
21 stem
22 disk
24 seat ring
25 seat retainer
26 plate spring (spring member)
41 flexible part
42 fixing part
43 gasket part
50 annular contact surface
51 thin-walled part
53 gap part
54 annular protruding part
55 annular contact part
60 retainer bolt
P1 point
P2 point (end portion of the annular contact surface on an outer diameter side)
H normal

The invention claimed is:

1. An eccentric butterfly valve in which a disk axially supported so as to be rotatable at an eccentric position via a stem inside a cylindrical body is provided to a seat ring fixed with a seat retainer inside the body so as to be hermetically sealable, wherein a flexible part which is tilted in accordance with displacement of the disk is formed on an inner diameter side of the seat ring; a spring member is mounted between this flexible part and the seat retainer, the spring which mutually springs back thereonto; this spring member is a spring in which, with the disk being displaced to the seat retainer side in a flow-path direction, a load in a spring-back direction increases in accordance with a magnitude of tilt of the flexible part by this displacement of the disk; and, when the flexible part is elastically deformed, the spring member pressurized by this flexible part is elastically deformed in a state in which a contact with the seat retainer is avoided, and is also mounted in a state in which a contact position with the seat ring gradually makes a transition from the inner diameter side to the outer diameter side with an increase in the tilt of the flexible part.

2. The eccentric butterfly valve according to claim 1, wherein the spring member is formed of an annular plate spring, and this plate spring is mounted so that, in a state in which an outer diameter side is caused to make contact with the seat retainer on a side faced to the seat retainer and an inner diameter side with respect to a position of contact to the seat retainer side is caused to make contact with the flexible part on a side faced to the seat ring, a position of contact with the seat ring gradually makes a transition from the inner diameter side to the outer diameter side with an increase in the tilt of the flexible part.

3. The eccentric butterfly valve according to claim 2, wherein in the flexible part, an annular contact surface which makes contact with this plate spring is formed on a side faced to the plate spring, and this annular contact surface is formed of a taper surface tilted at a predetermined angle from an inner diameter side to an outer diameter direction.

4. The eccentric butterfly valve according to claim 3, wherein a fixing part which is fixed between the body and the seat retainer is integrally formed on an outer diameter side of the flexible part, and a gasket part integrally coupled via a thin-walled part to an annular periphery on an outer circumferential surface side of this fixing part is tightly interposed between the body and the seat retainer.

5. The eccentric butterfly valve according to claim 3, wherein in a hermetically-sealed state between the seat ring and the disk, the seat ring is fastened and fixed between the body and the seat retainer with a retainer bolt for fastening.

6. The eccentric butterfly valve according to claim 3, wherein the seat retainer has an annular protruding part having a trapezoidal cross section annularly formed on a side in contact with the plate spring, an annular contact part is formed at an outer diameter position of this annular protruding part, the annular contact part which makes a linear contact with the plate spring and serves as a fulcrum when the plate spring is elastically deformed, and a gap part which avoids a contact of a tilted portion of the spring member is formed on an inner diameter side of this annular contact part.

7. The eccentric butterfly valve according to claim 6, wherein an end portion of the annular contact surface on an outer diameter side is arranged on an inner diameter side of a normal with respect to the plate spring at a position of contact between the annular contact part and the plate spring.

8. The eccentric butterfly valve according to claim 2, wherein the seat retainer has an annular protruding part having a trapezoidal cross section annularly formed on a side in contact with the plate spring, an annular contact part is formed at an outer diameter position of this annular protruding part, the annular contact part which makes a linear contact with the plate spring and serves as a fulcrum when the plate spring is elastically deformed, and a gap part which avoids a contact of a tilted portion of the spring member is formed on an inner diameter side of this annular contact part.

9. The eccentric butterfly valve according to claim 8, wherein a fixing part which is fixed between the body and the seat retainer is integrally formed on an outer diameter side of the flexible part, and a gasket part integrally coupled via a thin-walled part to an annular periphery on an outer circumferential surface side of this fixing part is tightly interposed between the body and the seat retainer.

10. The eccentric butterfly valve according to claim 8, wherein in a hermetically-sealed state between the seat ring and the disk, the seat ring is fastened and fixed between the body and the seat retainer with a retainer bolt for fastening.

11. The eccentric butterfly valve according to claim 8, wherein an end portion of the annular contact surface on an outer diameter side is arranged on an inner diameter side of a normal with respect to the plate spring at a position of contact between the annular contact part and the plate spring.

12. The eccentric butterfly valve according to claim 11, wherein a fixing part which is fixed between the body and the seat retainer is integrally formed on an outer diameter side of the flexible part, and a gasket part integrally coupled via a thin-walled part to an annular periphery on an outer circumferential surface side of this fixing part is tightly interposed between the body and the seat retainer.

13. The eccentric butterfly valve according to claim 11, wherein in a hermetically-sealed state between the seat ring and the disk, the seat ring is fastened and fixed between the body and the seat retainer with a retainer bolt for fastening.

14. The eccentric butterfly valve according to claim 2, wherein a fixing part which is fixed between the body and the seat retainer is integrally formed on an outer diameter side of the flexible part, and a gasket part integrally coupled via a thin-walled part to an annular periphery on an outer circumferential surface side of this fixing part is tightly interposed between the body and the seat retainer.

15. The eccentric butterfly valve according to claim 2, wherein in a hermetically-sealed state between the seat ring and the disk, the seat ring is fastened and fixed between the body and the seat retainer with a retainer bolt for fastening.

16. The eccentric butterfly valve according to claim 1, wherein a fixing part which is fixed between the body and the seat retainer is integrally formed on an outer diameter side of the flexible part, and a gasket part integrally coupled via a thin-walled part to an annular periphery on an outer circumferential surface side of this fixing part is tightly interposed between the body and the seat retainer.

17. The eccentric butterfly valve according to claim 16, wherein in a hermetically-sealed state between the seat ring and the disk, the seat ring is fastened and fixed between the body and the seat retainer with a retainer bolt for fastening.

18. The eccentric butterfly valve according to claim 1, wherein in a hermetically-sealed state between the seat ring and the disk, the seat ring is fastened and fixed between the body and the seat retainer with a retainer bolt for fastening.

* * * * *